(12) United States Patent
Allsop et al.

(10) Patent No.: US 12,466,636 B2
(45) Date of Patent: Nov. 11, 2025

(54) PRESSURISED DISPENSING CONTAINER

(71) Applicant: Bespak Europe Limited, King's Lynn (GB)

(72) Inventors: Paul Allsop, King's Lynn (GB); Jaysukhlal Mohanlal Bhogaita, King's Lynn (GB); Andrew Ian Sapsford, King's Lynn (GB)

(73) Assignee: Bespak Europe Limited, King's Lynn (GB)

( * ) Notice: Subject to any disclaimer, the term of this patent is extended or adjusted under 35 U.S.C. 154(b) by 711 days.

(21) Appl. No.: 17/797,417

(22) PCT Filed: Jan. 26, 2021

(86) PCT No.: PCT/GB2021/050175
§ 371 (c)(1),
(2) Date: Aug. 3, 2022

(87) PCT Pub. No.: WO2021/156602
PCT Pub. Date: Aug. 12, 2021

(65) Prior Publication Data
US 2023/0082549 A1 Mar. 16, 2023

(30) Foreign Application Priority Data

Feb. 5, 2020 (GB) ..................................... 2001537
Dec. 22, 2020 (GB) ..................................... 2020387

(51) Int. Cl.
*B65D 83/52* (2025.01)
*A61M 15/00* (2006.01)
(Continued)

(52) U.S. Cl.
CPC ........... *B65D 83/52* (2013.01); *B65D 83/141* (2025.01); *C09K 3/1006* (2013.01); *C09K 3/30* (2013.01);
(Continued)

(58) Field of Classification Search
None
See application file for complete search history.

(56) References Cited

U.S. PATENT DOCUMENTS 6,095,182 A 8/2000 Warby
2003/0180228 A1 9/2003 Cripps
(Continued)

FOREIGN PATENT DOCUMENTS

CN 1444489 9/2003
CN 1874756 12/2006
(Continued)

OTHER PUBLICATIONS

First Notice of Examination Action, dated Aug. 31, 2023, Chinese Patent Application No. 202180011442.4 (14 pgs.).
(Continued)

*Primary Examiner* — Bradley H Philips
(74) *Attorney, Agent, or Firm* — Fitch, Even, Tabin & Flannery LLP

(57) ABSTRACT

A pressurised dispensing container (10) comprising a container (11) for product to be dispensed, and a valve fixed to the container, wherein the container contains a propellant comprising 1,1-difluoroethane or a derivative thereof and optionally ethanol. The valve comprises a valve stem (15), a valve body (16, 18) and one or more seals (20, 21), the valve stem being slidable within the valve body, the one or more seals co-operating with the valve stem for regulating discharge of a fluid. The valve further comprises a sealing gasket (14) for sealing the valve to the dispensing container. The one or more seals (20, 21) is/are formed from (i) an elastomeric composition, preferably an elastomeric composition comprising an ethylene-propylene-diene terpolymer.
(Continued)

Figure 1:
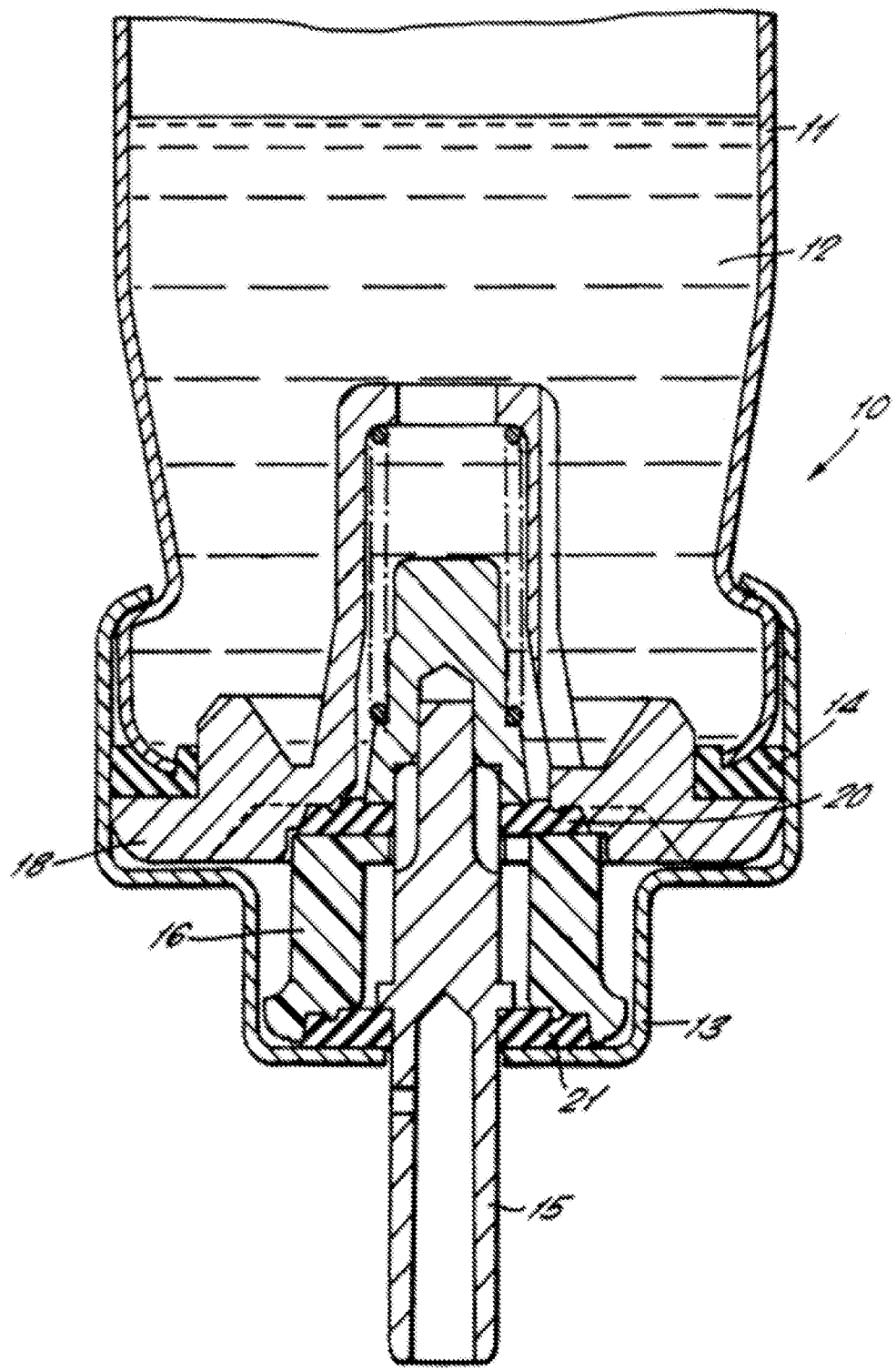

The sealing gasket (14) is formed from (ii) an elastomeric composition comprising an isobutylene polymer or co-polymer thereof.

21 Claims, 4 Drawing Sheets

(51) Int. Cl.
  *B65D 83/141* (2025.01)
  *C09K 3/10* (2006.01)
  *C09K 3/30* (2006.01)

(52) U.S. Cl.
  CPC ... *A61M 15/009* (2013.01); *C09K 2003/1053* (2013.01); *C09K 2200/0642* (2013.01)

(56) References Cited

U.S. PATENT DOCUMENTS

| | | | |
|---|---|---|---|
| 2006/0211589 A1 | 9/2006 | Godfrey | |
| 2007/0086953 A1 | 4/2007 | Meakin | |
| 2008/0190418 A1 | 8/2008 | Miller | |
| 2010/0000524 A1 | 1/2010 | Ohbi | |
| 2023/0347080 A1 * | 11/2023 | Zambelli | A61K 9/008 |

FOREIGN PATENT DOCUMENTS

| | | | | |
|---|---|---|---|---|
| CN | 1950075 | | 4/2007 | |
| CN | 101511964 | | 8/2009 | |
| CN | 108289843 | | 7/2018 | |
| EP | 0801009 | | 10/1997 | |
| EP | 0803449 | | 10/1997 | |
| EP | 2407145 | | 1/2012 | |
| EP | 3556347 A1 | * | 10/2019 | ............ A61P 43/00 |
| FR | 2549568 | | 1/1985 | |
| GB | 1201918 | | 8/1970 | |
| GB | 2148912 | | 6/1985 | |
| GB | 2340477 | | 2/2000 | |
| GB | 2401099 | | 11/2004 | |
| GB | 2456028 | | 7/2009 | |
| GB | 2456028 A | * | 7/2009 | ............ B65D 83/52 |
| JP | 2007502170 | | 2/2007 | |
| JP | 2013532189 | | 8/2013 | |
| WO | 1995002651 | | 1/1995 | |
| WO | 1997001611 | | 1/1997 | |
| WO | 2003078538 | | 9/2003 | |
| WO | WO-2005023330 A2 | * | 3/2005 | ............ A61K 31/569 |
| WO | 2006092618 | | 9/2006 | |
| WO | 2012009302 | | 1/2012 | |
| WO | 2017021698 | | 2/2017 | |
| WO | WO-2017021698 A1 | * | 2/2017 | ............ B65D 83/52 |

OTHER PUBLICATIONS

International Search Report and Written Opinion of the International Searching Authority, date of mailing May 3, 2021; International Application No. PCT/GB2021/050175 ( 12 pgs.).

Decision of Grant, dated Jan. 6, 2023, Japanese Patent Application No. 2022548181, with English translation (4 pgs.).

Second Office Action dated Mar. 29, 2024, Japanese Patent Application No. 202180011442.4, with English translation (16 pgs.).

Office Action dated Apr. 28, 2025, Japanese Patent Application No. 2024-028119 with English translation (4 pgs.).

* cited by examiner

PRESSURISED DISPENSING CONTAINER

CROSS REFERENCE TO RELATED APPLICATIONS

This application is a U.S. national phase application of International Application No. PCT/GB2021/050175, filed Jan. 26, 2021, which claims benefit from United Kingdom Application No. 2001537.6, filed Feb. 5, 2020, and United Kingdom Application No. 2020387.3, filed Dec. 22, 2020, which are each hereby incorporated herein by reference in their entirety.

FIELD

The present invention relates to a pressurised dispensing container and elastomeric seal materials for use therein. The pressurised dispensing container may be used for dispensing pressurised fluid in the form of an aerosol. The pressurised dispensing container finds application as a pharmaceutical dispensing device such as a pressurised metered dose aerosol inhaler device (pMDI) and in medical check devices suitable for dispensing a pharmaceutical.

BACKGROUND

It is known from GB 1201918 for example to provide dispensing apparatus in which fluid from a pressurised dispensing container is released by a valve in a controlled manner, the valve including elastomeric seals which are annular and which cooperate with a sliding valve stem to open and close fluid ports. FR-A-2,549,568, WO95/02651 and GB 2148912 and PCT/GB96/01551 each disclose further examples of such dispensing apparatus.

The required material properties necessary for good seal performance for pharmaceutical applications include: chemical compatibility (swell), tensile strength, permanent compression set, stress relaxation, elastic modulus, regulatory compliance, low permeability to fluids and gases, low levels of extractables and leachables, and stable properties after extraction.

As well as the requirement for good engineering properties, there is a requirement for sanitary properties, including low levels of extractables and leachables, which might otherwise increase impurities of drug products to unacceptable levels, as well as potentially reacting with the drug product, vehicle or excipients. In this connection, products to be dispensed from a pMDI are commonly provided in solution or suspension in a propellant base, this being particularly common in the dispensing of medicinal compounds for inhalation therapy. The metering valves used in dispensing devices such as pMDIs are typically constructed from a mixture of metal and/or thermoplastic parts and elastomeric rubber parts.

Known rubber compounds for sealing pharmaceutical metered dose aerosol inhalers include those based on the traditional technology of vulcanising a synthetic or natural rubber polymer.

Products to be dispensed are commonly provided in solution or suspension in an alcohol or non-alcohol base, this being particularly common in the dispensing of medicinal compounds for inhalation therapy.

A typical apparatus includes a hydrofluoroalkane (HFA) volatile propellant, e.g. conventional propellants, such as HFA134a, and having a liquid phase in which the product together with the alcohol carrier is readily soluble within the container. A typical material for use in the valve seal is a synthetic rubber such as chloroprene rubber.

SUMMARY

It is an object of the present invention to provide a pressurised dispensing container which can be used with propellants based on 1,1-difluoroethane. In addition, the pressurised dispensing container may also be suitable for use with other low global warming propellants or combinations thereof. In addition, the pressurised dispensing container may also be suitable for use with propellants such as 1,1,1,2-tetrafluoroethane (HFA134a) or 1,1,1,2,3,3,3-Heptafluoropropane (HFA227), for example when one or more of HFA134a and HFA227 are used in combination with 1,1-difluoroethane.

Accordingly, in a first aspect, the present invention provides a pressurised dispensing container comprising a container for product to be dispensed, and a valve fixed to the container, wherein the container contains a propellant comprising 1,1-difluoroethane or a derivative thereof and optionally an alcohol such as ethanol,
  wherein the valve comprises a valve stem, a valve body and one or more seals, the valve stem being slidable within the valve body, the one or more seals cooperating with the valve stem for regulating discharge of a fluid,
  wherein the valve further comprises a sealing gasket for sealing the valve to the dispensing container,
  wherein the one or more seals is/are formed from (i) an elastomeric composition, preferably an elastomeric composition comprising an ethylene-propylene-diene terpolymer, and
  the sealing gasket is formed from (ii) an elastomeric composition comprising an isobutylene polymer or co-polymer thereof.

In the first aspect, the propellant preferably comprises or consists of HFA152a and optionally an alcohol such as ethanol. Compared to conventional chlorofluorocarbons propellants, HFA152a is reported to have an ozone depletion potential of zero, a lower global warming potential and a shorter atmospheric lifetime.

In the first aspect the propellant may alternatively comprise or consist of a combination of HFA152a and HFA134a and optionally an alcohol such as ethanol. In the first aspect the propellant may alternatively comprise or consist of a combination of HFA152a and HFA227ea and optionally an alcohol such as ethanol.

DRAWINGS

Figure 2:
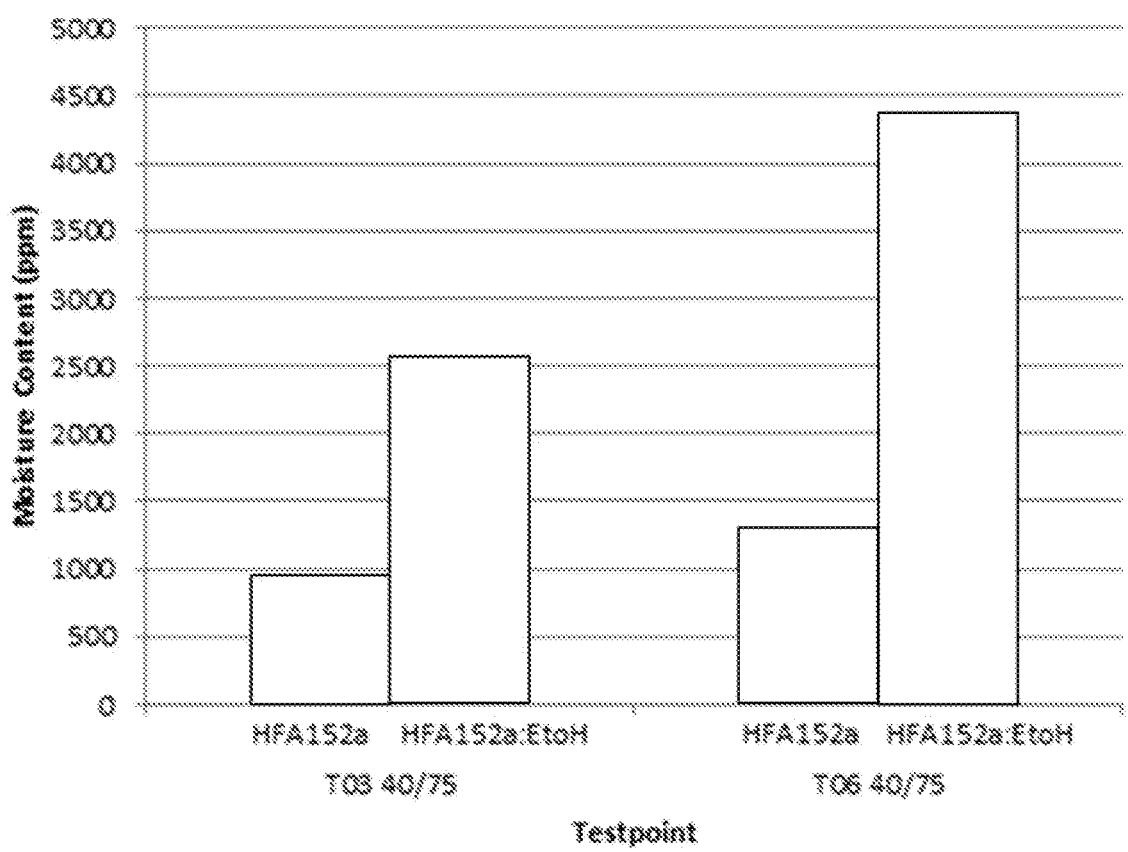
Figure 3:
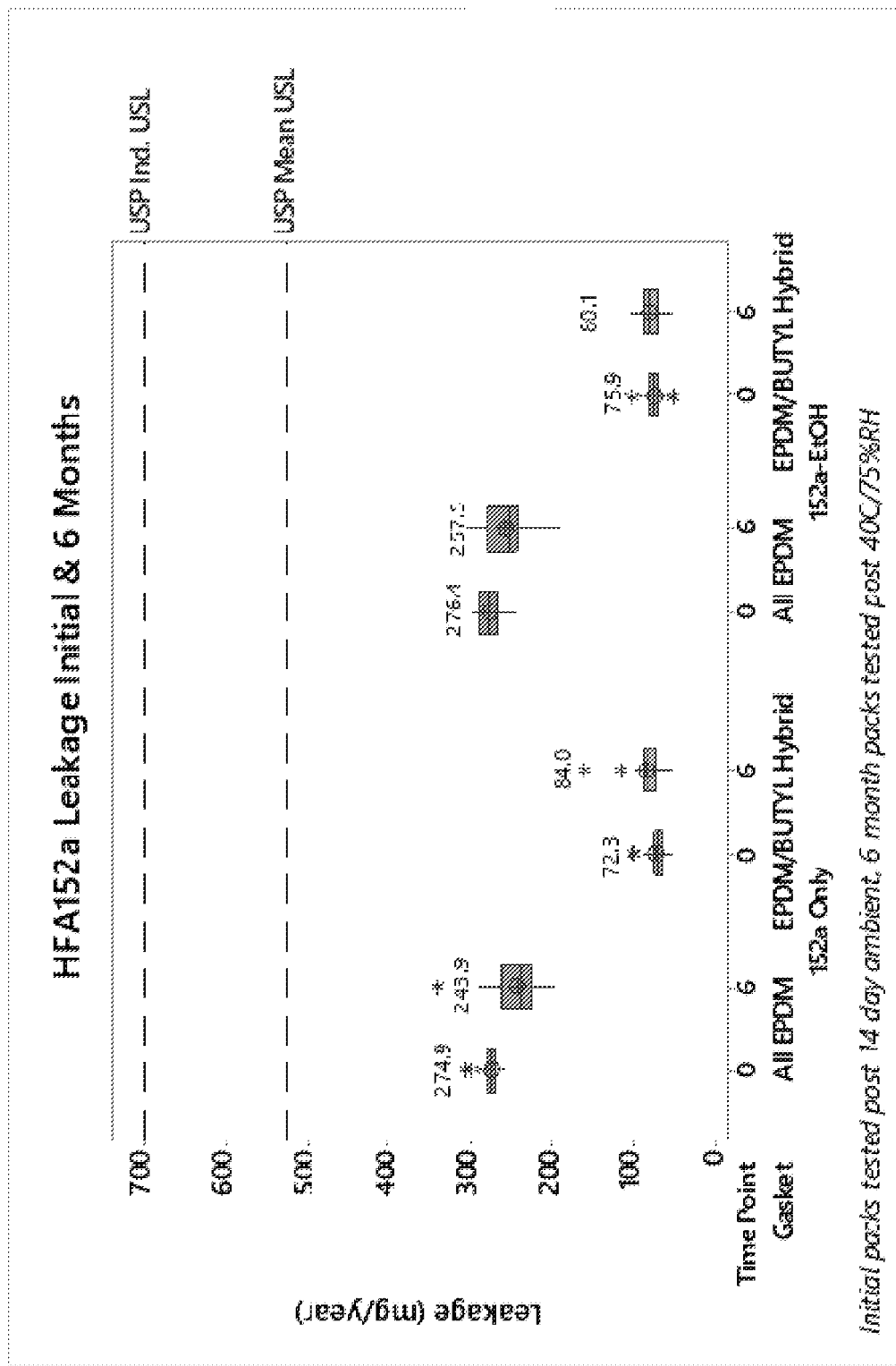
Figure 4:
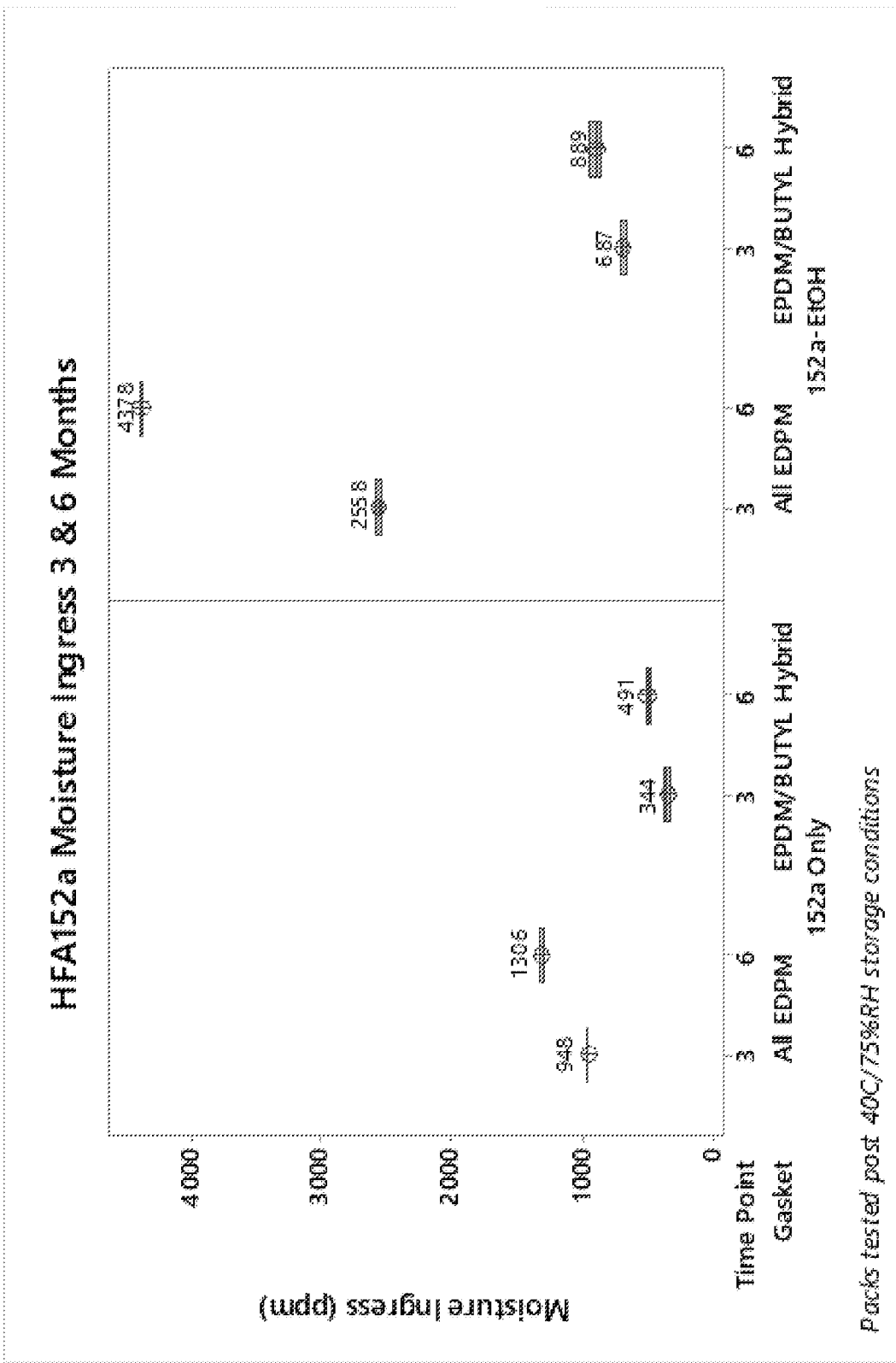

The following drawings are provided by way of example to help understand certain aspects of the present invention:
  FIG. 1 shows, by way of example only, a pressurised dispensing container.
  FIG. 2 shows moisture content (ppm) data relating to stability storage of a filled canister where the sealing gasket comprises ethylene-propylene-diene terpolymer (EPDM).
  FIG. 3 shows data demonstrating that a lower amount of static leakage can be achieved with a hybrid valve configuration according to the present invention which contains a bromobutyl (typically, e.g., an isobutylene polymer) gasket compared to a similar valve configuration that only contains EPDM as the primary atmospheric gasket seal.
  FIG. 4 shows data demonstrating that a lower amount of moisture ingress can be achieved with a hybrid valve configuration according to the present invention which contains a bromobutyl (typically, e.g., an isobutylene polymer) gasket compared to a similar valve configuration that only contains EPDM as the primary atmospheric gasket seal.

SEALING GASKET (ALSO KNOWN AS A STATIC SEAL)

In the present invention, the sealing gasket is formed from (ii) an elastomeric composition comprising an isobutylene polymer or co-polymer thereof.

The sealing gasket may also be referred to as a static seal, in contrast to the one or more seals co-operating with the valve stem, which may be referred to as a dynamic seal or seals.

The purpose of the sealing gasket is to provide a seal between the valve and the dispensing container, thereby preventing the escape of the contents of the dispensing container, for example leakage of the propellant. Arguably as important, if not more so, the sealing gasket prevents the ingress of unwanted constituents, e.g. moisture, into the container, which can have a deleterious effect on the product, e.g. drug or pharmaceutical, to be dispensed. For example, the presence of excess moisture in propellant suspensions can lead to a reduction in fine particle mass through drug particle agglomeration, reducing the therapeutic effect of the active pharmaceutical ingredient (API). Moisture can also result in oxidation of the API formulation.

The inventors have found that (ii) an elastomeric composition comprising an isobutylene polymer or co-polymer thereof, provides a particularly effective seal when the propellant is or comprises 1,1-difluoroethane (e.g. HFA152a) or a derivative thereof. While not wishing to be bound by theory, HFA152a has a higher dipole moment than conventional propellants, such as HFA134a, and may therefore be more hygroscopic, thereby leading to higher moisture ingress into the container. Surprisingly the inventors found that conventional EPDM polymers did not perform well in moisture ingress tests for propellants based on 1,1-difluoroethane. The propellant is often provided in conjunction with an alcohol such as ethanol. The inventors further found that moisture ingress into the container was compounded when alcohol was present. The elastomeric composition (ii) described herein surprisingly provide an effective moisture barrier when the propellant includes an alcohol such as ethanol.

The sealing gasket according to the present invention may also be compatible with the propellants described herein in terms of helium gas permeability, low dipole moment, low change in permeability and creep behaviour with temperature, resistance to dissolving in the propellant, and low water absorption.

(ii) An Elastomeric Composition Comprising an Isobutylene Polymer or Co-Polymer Thereof The (ii) elastomeric composition comprises an isobutylene polymer or co-polymer thereof, for example one or more of polyisobutylene, polybutene, butyl rubber, halogenated butyl rubber, including derivatives thereof. More preferably, the elastomeric composition comprises butyl rubber or bromobutyl rubber. Butyl rubber is a copolymer made from isobutylene and a small amount of a diolefin such as, for example, isoprene (2-methylbuta-1,3-diene).

Typically, butyl rubber comprises approximately 97% isobutylene and approximately 3% isoprene, and it may be polymerized using an aluminium chloride catalyst.

Halogenated butyl rubbers such as bromobutyl rubber and chlorobutyl rubber may be made by treating isoprene-isobutylene rubber with bromine/chlorine. It will be understood that the term isobutylene polymer as used herein is intended to cover halogenated polymers.

The (ii) elastomeric composition may further comprise (a) a cross-linking agent for the isobutylene polymer or co-polymer thereof; and optionally (b) an accelerator for the cross-linking agent.

It will be appreciated that the (ii) elastomeric composition may comprise a blend of an isobutylene polymer or co-polymer thereof with another polymer, such as a chlorine-substituted diene polymer. For example, a blend of butyl rubber (e.g. bromobutyl rubber) and polychloroprene may be used. Blending of polychloroprene with the non-polar butyl is advantageous as it allows dissipation of static charge. Static charge builds up during the automated valve assembly process and or during storage in plastic bags can cause seals to self-adhere and pose problems in valve assembly.

If present, the crosslinking agent (also known as a curing agent) provides or facilitates network formation to result in a three-dimensional polymer network structure. The cross-linking agent may act by reacting with the functional groups on the polymer chain. The cross-linking agent will typically comprise sulphur or a sulphur-containing compound. The cross-linking agent is preferably substantially free of any peroxide curing agents such as, for example, dicumyl peroxide.

The accelerator, if present, preferably includes a polysulphide compound derived from a substituted dithiocarbonic acid or derivative thereof. The polysulphide compound is preferably derived from a substituted xanthic acid or derivative thereof, preferably of the type ROC (S) SH, in which R is typically an alkyl radical. The substituted group in the polysulphide compound typically comprises an isopropyl group. The polysulphide compound preferably comprises three or more bridging sulphur atoms, more preferably 3,4 or 5 bridging sulphur atoms. The polysulphide compound is preferably substantially free from nitrogen, phosphorus and metallic elements. Advantageously, the polysulphide compound comprises or consists of diisopropyl xanthogen polysulphide.

The elastomeric composition (ii) typically comprises up to 3 wt. % of the accelerator based on the total weight of the accelerator and polymer in the composition, more typically up to 1.5 wt. % of the accelerator based on the total weight of the accelerator and polymer in the composition, still more typically up to 1 wt. % of the accelerator based on the total weight of the accelerator and polymer.

The weight ratio of the accelerator to the cross-linking agent in the elastomeric composition (ii) is preferably in the range of from 1:1 to 3:1, more preferably from 1:1 to 2:1.

It will be understood that the (ii) elastomeric composition may further contain one or more additives, process aids, crosslinking agents, accelerators, and/or fillers. It may also be blended with additional polymer(s) or copolymer(s).

The sealing gasket comprising the (ii) elastomeric composition may be produced by conventional forming techniques such as, for example, compression moulding and/or extrusion.

The initiation of the cross-linking reaction may be achieved by any of the known conventional techniques, for example heating the formulation to at least the curing reaction temperature, which is typically in the range of from 130 to 200° C. A preferred process involves forming rubber compound strips (typically of approximately 1 mm thickness) by compression moulding. The moulding temperature is typically in the range 160-180° C. The cure time is typically in the range 1-10 minutes. The moulded strips are preferably post cured in an air oven for typically 1 hour at 150° C.

The strips may then be made into gaskets using a punching device.

The use of the accelerator as herein described in the (ii) elastomeric composition according to the present invention can eliminate the need for free sulphur in the cross-linking process. The accelerator as herein described is preferably provided as a liquid and is preferably miscible with the polymer to provide a homogeneous dispersion. It has been found that the use of such an accelerator facilitates filler dispersion and can obviate the need for a separate plasticiser. The presence of plasticisers is undesirable in that they tend to leach out of the material. In contrast, the accelerator as herein described forms or is part of the cross-linked network and therefore does not leach out into the drug media. In the seal compositions according to the present invention the accelerator is typically almost totally consumed during the cross-linking reaction. This results in a cleaner rubber and the extractables are reduced. Typically, substantially no nitrosamines are generated during the cross-linking reaction.

Elastomeric compositions comprising an isobutylene polymer or co-polymer thereof are described in, for example, WO 03/078538 A1.

One or More Seals (also known as Dynamic Seal or Seals)

The one or more seals is/are formed from (i) an elastomeric composition, preferably an elastomeric composition comprising an ethylene-propylene-diene terpolymer.

Because the one or more seals co-operate with the valve stem, which is slidable within the valve body, such seals may also be referred to as dynamic seals. The mechanical properties of these seals are important to provide durability and consistent metering of product and propellant. Butyl rubbers may show inferior compression set properties compared to ethylene-propylene-diene terpolymer (EPDM), thus rendering them sub-optimal when used as a dynamic seal in pressurised dispensing containers of the type described herein. In contrast, the elastomeric composition (i), comprising ethylene-propylene-diene terpolymer, has very good mechanical properties and exhibits reduced compression set making it more effective as a dynamic seal. Moreover, the inventors have found that an elastomeric composition comprising an isobutylene polymer or co-polymer thereof provides an effective leakage and moisture seal (i.e. a static seal) when using a propellant comprising or consisting of 1,1-difluoroethane (e.g. HFA152a).

A preferred ethylene-propylene-diene terpolymer for use in the (i) elastomeric composition comprises from 40 to 70 wt. % ethylene, from 30 to 50 wt. % propylene, and ENB (ethylidenenorbornene) in an amount of 0.5 to 9 wt. %.

More preferably, the terpolymer preferably comprises from 45 to 65 wt. % ethylene, from 35 to 45 wt. % propylene, and from 2 to 8 wt. % ENB. More preferably, the terpolymer comprises 50 to 60 wt. % ethylene, from 38 to 43 wt. % propylene, and from 3 to 7 wt. % ENB. Most preferably, the terpolymer comprises approximately 50 wt. % ethylene, approximately 45 wt. % propylene, and approximately 5 wt. % ENB.

The ethylene content may be determined by ASTM D3900. The propylene content may be determined by ASTM D3900. The ENB content may be determined by ASTM D6047.

The terpolymer may be manufactured using a constrained geometry catalyst system. For example, a metallocene constrained geometry catalyst system, such as one based on titanium monocyclopentadienyl, preferably with a silane group incorporated therein.

The terpolymer preferably has a Mooney Viscosity (ML 1+4, 125° C.) of from 10 to 90, more preferably from 20 to 80, more preferably from 30 to 70, still more preferably from 30 to 50. Most preferably, the terpolymer has a Mooney Viscosity (ML 1+4, 125° C.) of approximately 40. The Mooney Viscosity may be determined by ASTM D1646. The unit for mooney viscosity is mooney units, MU.

Preferably, the terpolymer has a density of from 0.84 to 0.90 g/cm$^3$, more preferably from 0.85 to 0.87 g/cm$^3$, still more preferably approximately 0.86 g/cm$^3$. The density may be determined by ASTM D297.

Preferably, the terpolymer has an ash content of <0.1 wt. %, and a total volatiles content of <0.4 wt. %.

Preferably, the terpolymer has a medium molecular weight distribution.

It will be understood that the (i) elastomeric composition, e.g. an ethylene-propylene-diene terpolymer, may further contain one or more additives, process aids, crosslinking agents, accelerators, and/or fillers. It may also be blended with additional polymer(s) or copolymer(s).

The seal comprising the (i) elastomeric composition, e.g. an ethylene-propylene-diene terpolymer, may be produced by conventional forming techniques such as, for example, compression moulding and/or extrusion.

Elastomeric compositions comprising an ethylene-propylene-diene terpolymer are described in, for example, WO 2017/021698 A1.

General

The following description is applicable to all aspects of the present invention unless otherwise indicated.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The term seal as used herein is intended to encompass any sealing member or portion thereof present in, e.g., a pharmaceutical dispensing device, such as a metered dose inhaler, including, but not limited to, gaskets and seals whether static or dynamic. It will be appreciated that the seal may be provided as a separate component or may be formed integrally with the valve, i.e. be co-moulded. The term sealing gasket as used herein is primarily used to refer to a static seal.

The seal or gasket may further include a filler, preferably a mineral and/or inorganic filler. Mineral fillers are preferable to carbon black in order to minimise the formation of polynuclear aromatic hydrocarbon compounds. Suitable examples include any of magnesium silicate, aluminium silicate, titanium oxide, zinc oxide, calcium carbonate, magnesium oxide magnesium carbonate, magnesium aluminium silicate, aluminium hydroxide, talc, kaolin and clay, including combinations of two or more thereof. Preferably, the filler is or comprises one or more of magnesium silicate, talc, calcined clay, nano particle clays, kaolin and/or amino silane coated clay or clay coated with a titanium or zirconate coupling agent. The filler is typically present in the seal material in an amount of from 1 to 65 wt. %, preferably from 2 to 60 wt. %, more preferably from 5 to 55 wt. %.

Where appropriate, the seal or gasket may further include a process aid, preferably a low molecular weight polyethylene, stearic acid or an organic or non-organic stearate. The process aid, for example stearic acid, may be provided in the gasket seal in an amount of up to 1 wt. %.

Where appropriate, the seal or gasket may further include a curing or cross-linking agent. For example, the seal or gasket may further include a peroxide curing agent, sulphur or a sulphur-containing compound. A peroxide curing agent such as, for example, dialkyl peroxide is, however, preferable to other curing agents such as sulphur since its use minimises the formation of extractives (e.g. 2-mercaptobenzothiazole, N-nitrosamines, mercaptobenzothiazole disulphide) resulting from contact between the material and alcohol in use. The curing or cross-linking agent (for example a dialkyl peroxide) may be provided in the seal in an amount of up to 7 wt. %.

The seal or gasket may further comprise one or more of a reinforcement agent, a plasticizer, a binder, a stabilizer, a process aid, a retarder, a bonding agent, an antioxidant, a lubricant, a pigment, a wax, a resin, an antiozonants, a primary accelerator, a secondary accelerator and/or a crosslink activator. One or more of these may be provided in the seal in an amount of up to 1 wt. %. For example, an antioxidant, such as, for example, octylated diphenylamine, may be included in an amount of up to 0.7 wt. %.

It will be appreciated that certain constituents may have more than one effect. For example, zinc oxide may act as an activator and as a filler. Similarly, magnesium oxide may act as an acid absorber and as a filler.

In most pharmaceutical applications it is also necessary to extract or wash the cured elastomer in order to remove surface residues and by-products resulting from the cure reaction and moulding process. The seal or gasket is therefore preferably subjected to a wash and/or an extraction to reduce or eliminate extractives and/or leachables. For example, a solvent-extraction and/a supercritical fluid-extraction. An alcohol extraction is preferred. An alcohol extraction (for example an ethanol extraction) of the seal or gasket is preferably performed after the seal or gasket has been manufactured and before the valve is assembled. This step reduces or eliminates extractives and/or leachables. In this process, the seal/gasket components are loaded into a glass column and washed by refluxing ethanol.

Where appropriate, the seal or gasket may also be comoulded if desired with thermoplastics such as PBT, nylon and/or polyacetal.

The present invention is directed to a pressurised dispensing container. Examples include a pharmaceutical metered dose aerosol inhaler device, a syringe, and an auto injector. A preferred use of the seal and gaskets described herein is in a pressurised pharmaceutical metered dose aerosol inhaler device for dispensing a pharmaceutical.

The container may be made, for example, from any suitable plastic or metal or glass material which is essentially gas and water impermeable. An example of a suitable plastic material is polyester.

FIG. 1 shows, by way of example only, a pressurised dispensing container 10. The pressurised dispensing container 10 is illustrated merely as one example of a possible application of the present invention. The skilled reader will understand that other applications of the present invention are possible and, as such, the following description of the pressurised dispensing container 10 should not be taken as limiting.

The pressurised dispensing container 10 may comprise a dispensing container 11 in which a product 12 is stored to be dispensed in metered doses. A valve may be held in position to seal the dispensing container 11 by a ferrule 13 which is crimped to the open neck of the dispensing container 11. The valve further comprises a sealing gasket 14 for sealing the valve to the dispensing container 11. The sealing gasket 14 may be a static seal.

The valve comprises a valve stem 15, a valve body 16, 18 and one or more seals 20, 21, the valve stem 15 being slidable within the valve body 16, 18, the one or more seals 20, 21 co-operating with the valve stem 15 for regulating discharge of a fluid.

The one or more seals 20, 21 may comprise an inner seal 20 and an outer seal 21. Both the inner seal 20 and the outer seal 21 may form a dynamic, sliding seal with the valve stem 15.

The present invention is suitable for use with a range of metering valves and the example of FIG. 1 is just one possible design. The present invention is suitable for use with metering valve including, but not limited to, capillary-retention valves and fast-fill, fast-empty valves. Operation of such metering valves is described in more detail in publications U.S. Pat. No. 6,095,182, GB 2401099, GB 2340477, EP 0803449 and EP 0801009 and the reader is directed to those publications for a fuller understanding of the operation of metering valves and MDIs in general.

The term pharmaceutical as used herein is intended to encompass any pharmaceutical, compound, composition, medicament, agent or product which can be delivered or administered to a human being or animal, for example pharmaceuticals, drugs, biological and medicinal products. Examples include antiallergics, analgesics, bronchodilators, antihistamines, therapeutic proteins and peptides, antitussives, anginal preparations, antibiotics, anti-inflammatory preparations, hormones, or sulfonamides, such as, for example, a vasoconstrictive amine, an enzyme, an alkaloid, or a steroid, including combinations of two or more thereof. In particular, examples include isoproterenol [alpha-(isopropylaminomethyl) protocatechuyl alcohol], phenylephrine, phenylpropanolamine, glucagon, adrenochrome, trypsin, epinephrine, ephedrine, narcotine, codeine, atropine, heparin, morphine, dihydromorphinone, ergotamine, scopolamine, methapyrilene, cyanocobalamin, terbutaline, rimiterol, salbutamol, flunisolide, colchicine, pirbuterol, beclomethasone, orciprenaline, fentanyl, and diamorphine, streptomycin, penicillin, procaine penicillin, tetracycline, chlorotetracycline and hydroxytetracycline, adrenocorticotropic hormone and adrenocortical hormones, such as cortisone, hydrocortisone, hydrocortisone acetate and prednisolone, insulin, cromolyn sodium, and mometasone, including combinations of two or more thereof.

The pharmaceutical may be used as either the free base or as one or more salts conventional in the art, such as, for example, acetate, benzenesulphonate, benzoate, bircarbonate, bitartrate, bromide, calcium edetate, camsylate, carbonate, chloride, citrate, dihydrochloride, edetate, edisylate, estolate, esylate, fumarate, fluceptate, gluconate, glutamate, glycollylarsanilate, hexylresorcinate, hydrobromide, hydrochloride, hydroxynaphthoate, iodide, isethionate, lactate, lactobionate, malate, maleate, mandelate, mesylate, methylbromide, methylnitrate, methylsulphate, mucate, napsylate, nitrate, pamoate, (embonate), pantothenate, phosphate, diphosphate, polygalacturonate, salicylate, stearate, subacetate, succinate, sulphate, tannate, tartrate, and triethiodide, including combinations of two or more thereof. Cationic salts may also be used, for example the alkali metals, e.g. Na and K, and ammonium salts and salts of amines known in the art to be pharmaceutically acceptable, for example glycine, ethylene diamine, choline, diethanolamine, triethanolamine, octadecylamine, diethylamine, triethylamine, 1-amino-2- propanol-amino-2-(hydroxymethyl)propane-1,3-diol, and 1-(3,4-dihydroxyphenyl)-2 isopropylaminoethanol.

The pharmaceutical will typically be one which is suitable for inhalation and may be provided in any suitable form for this purpose, for example as a powder or as a solution or suspension in a solvent or carrier liquid, for example ethanol.

The pharmaceutical may, for example, be one which is suitable for the treatment of asthma. Examples include salbutamol, beclomethasone, salmeterol, fluticasone, formoterol, terbutaline, sodium chromoglycate, budesonide and flunisolide, and physiologically acceptable salts (for example salbutamol sulphate, salmeterol xinafoate, fluticasone propionate, beclomethasone dipropionate, and terbutaline sulphate), solvates and esters, including combinations of two or more thereof. Individual isomers such as, for example, R-salbutamol, may also be used. As will be appreciated, the pharmaceutical may comprise of one or more active ingredients, an example of which is flutiform, and may optionally be provided together with a suitable carrier, for example a liquid carrier. One or more surfactants may be included if desired.

Further examples of formulations that include two active ingredients include: beclomethasone and formoterol; budesonide and formoterol; salmeterol and fluticasone; salbutamol and ipratropium bromide; and formoterol and mometasone. Examples of formulations that include three active ingredients include: formoterol, glycopyrrolate and mometasone; and beclamethasone, glycopyrrolate and formoterol.

In the pressurised dispensing container described herein, the fluid to be dispensed typically comprises a liquid or particulate product as a solution or suspension in a carrier liquid. The carrier liquid may preferably comprise an alcohol, for example ethanol. One or more surfactants may be present. One or both of oleic acid and/or glycerol may also be included in the carrier liquid.

The present invention will now be described further with reference to the following examples.

EXAMPLES

FIG. 2 shows Moisture Content (ppm) data relating to stability storage of a filled canister where the sealing gasket comprises EPDM. Time: T03=3 months; and T06=6 months. Condition: 40/75=temperature of 40° C. and 75% relative humidity.

After storage for 3 months and 6 months at 40° C./75% RH, the moisture ingress is higher than would be expected when using a conventional HFA134a propellant. This may suggest that HFA152a is more hygroscopic than HFA134a, perhaps on account of its greater dipole moment. The results indicate that conventional EPDM polymers do not perform well in moisture ingress tests for this propellant.

In contrast, the inventors have found that if the sealing gasket comprises (ii) an elastomeric composition comprising an isobutylene polymer or co-polymer thereof as herein described, then moisture content is reduced under similar conditions. The sealing gasket according to the present invention may also be compatible with the propellants described herein in terms of low helium gas permeability, low dipole moment, low change in permeability and creep behaviour with temperature, resistance to dissolving in the propellant, and low water absorption.

The following further exemplification is based on 6 months of analysis of two key performance requirements:

1. Static leakage—containment of propellant vapour in canister over product's shelf life through minimising leakage via the main atmospheric gasket seal; and
2. Moisture ingress—prevention of atmospheric moisture penetrating the canister over product's shelf life through minimising ingress via the main atmospheric gasket seal.

Although an all-EPDM valve is capable of meeting the required USP (United States Pharmacopeia) leakage specifications, with the alternative low GWP (global warming potential) propellant (HFA 152a), an EPDM/bromobutyl hybrid valve option has been developed in the present invention to (i) provide superior static leakage performance, and (ii) to reduce the amount of moisture ingress that is typically associated with the use of hygroscopic materials, such as propellant HFA 152a and HFA 152a mixtures containing excipients, e.g. ethanol.

The study data provided in FIG. 3 shows that a lower amount of static leakage can be achieved with a hybrid valve configuration according to the present invention which contains a bromobutyl (typically, e.g., an isobutylene polymer) gasket compared to a similar valve configuration that only contains EPDM as the primary atmospheric gasket seal. Data for propellant HFA 152a on its own and in combination with ethanol are provided.

The study data provided in FIG. 4 shows that a lower amount of moisture ingress can be achieved with a hybrid valve configuration according to the present invention which contains a bromobutyl (typically, e.g., an isobutylene polymer) gasket compared to a similar valve configuration that only contains EPDM as the primary atmospheric gasket seal. Data for propellant HFA 152a on its own and in combination with ethanol are provided.

With HFA 152a being a significantly different molecule (molecular size, diffusion coefficient and dipole moment) than previous propellants used in pMDI applications, the present invention has identified through analysis and experimentation an advantageous combination of pMDI valve elastomers to address the challenging performance characteristics associated with HFA propellant 152a.

Methods Used
Filling:
  Pack target fill weights: 10 g (with and without ethanol)
  Ethanol containing packs: 15%
Testing:
  Leakage test n=30 packs/time point
  Moisture test n=3 packs/time point
Storage:
  All packs stored in Ambient conditions for 2 weeks quarantine, followed by 40° C./75% RH for test periods listed.

The leakage and moisture ingress tests are conducted in accordance with European Medicines Agency standard ICH Topic Q 1 A (R2)/Step 5/Stability Testing of new Drug Substances and Products/NOTE FOR GUIDANCE ON STABILITY TESTING: STABILITY TESTING OF NEW DRUG SUBSTANCES AND PRODUCTS (CPMP/ICH/2736/99) (August 2003).

Leakage:
  T0=Packs tested post 2 weeks ambient storage.
  T6=Packs tested post 6 months in 40° C./75RH. Initial weights taken after 24 hours stability, then second weights after 7 days ambient storage.
Moisture Ingress:
  Karl Fischer titration method using a coulometer.
  T3=Testing performed after 3 months in 40° C./75% RH oven.

T6=Testing performed after 6 months in 40° C./75% RH oven.

The invention claimed is:

1. A pressurised dispensing container comprising a container for product to be dispensed, and a valve fixed to the container, wherein the container contains a propellant comprising 1,1-difluoroethane or a derivative thereof and optionally ethanol, wherein the valve comprises a valve stem, a valve body and one or more seals, the valve stem being slidable within the valve body, the one or more seals co-operating with the valve stem for regulating discharge of a fluid, wherein the valve further comprises a sealing gasket for sealing the valve to the dispensing container, wherein the one or more seals is/are formed from (i) an elastomeric composition comprising an ethylene-propylene-diene terpolymer, wherein the ethylene-propylene-diene terpolymer comprises from 40 to 70 wt. % ethylene, from 30 to 50 wt. % propylene, and ENB (ethylidenenorbornene) in an amount of 0.5 to 9 wt. %, and wherein the terpolymer has a Mooney Viscosity (ML 1+4, 125° C.) of from 10 to 90, and the sealing gasket is formed from (ii) an elastomeric composition comprising an isobutylene polymer or co-polymer thereof.

2. A pressurised dispensing container as claimed in claim 1, wherein the propellant comprises:
a) HFA152a and optionally ethanol;
b) a combination of HFA152a and HFA134a and optionally ethanol;
or
c) a combination of HFA152a and HFA227ea and optionally ethanol.

3. A pressurised dispensing container as claimed in claim 1, wherein the (ii) elastomeric composition comprises one or more of polyisobutylene, polybutene, butyl rubber, halogenated butyl rubber, including derivatives thereof.

4. A pressurised dispensing container as claimed in claim 3, wherein the (ii) elastomeric composition comprises a bromobutyl rubber.

5. A pressurised dispensing container as claimed in claim 1, wherein the (i) elastomeric composition comprises an ethylene-propylene-diene terpolymer, which terpolymer comprises from 45 to 65 wt. % ethylene, from 40 to 50 wt. % propylene, and ENB (ethylidenenorbornene) in an amount of 0.5 to 9 wt. %, wherein the terpolymer has a Mooney Viscosity (ML 1+4, 125° C.) of from 10 to 90.

6. A pressurised dispensing container as claimed in claim 1, wherein, wherein the one or more seals and/or the sealing gasket further comprise(s) a mineral and/or inorganic filter.

7. A pressurised dispensing container as claimed in claim 6, wherein the mineral filler and/or inorganic filler is selected from one or more of magnesium silicate, aluminium silicate, titanium oxide, zinc oxide, calcium carbonate, magnesium oxide magnesium carbonate, magnesium aluminium silicate, aluminium hydroxide, talc, kaolin and clay.

8. A pressurised dispensing container as claimed in claim 1, wherein the one or more seals and/or the sealing gasket further comprise(s) a process aid, preferably a low molecular weight polyethylene, stearic acid or an organic or non-organic stearate.

9. A pressurised dispensing container as claimed in claim 1, wherein the one or more seals and/or the sealing gasket further comprise(s) a curing agent.

10. A pressurised dispensing container as claimed in claim 1, wherein the one or more seals and/or the sealing gasket further comprise(s) one or more of a reinforcement agent, a plasticizer, a binder, a stabilizer, a retarder, a bonding agent, an antioxidant, a lubricant, a pigment, a wax, a resin, an antiozonant, a primary accelerator, a secondary accelerator or an activator.

11. A pressurised dispensing container as claimed in claim 1, wherein the sealing gasket is defined as being static, in that it seals between non-moving parts of the valve.

12. A pressurised dispensing container as claimed in claim 1, wherein the one or more seals is/are defined as being dynamic, in that it or they seal between moving parts of the valve.

13. A pressurised dispensing container as claimed in claim 1, wherein the one or more seals is/are mounted on the valve body.

14. A pressurised dispensing container as claimed in claim 1, wherein the one or more seals is/are mounted on the valve stem.

15. A pressurised dispensing container as claimed in claim 14, wherein a first seal is mounted on the valve body and a second seal is mounted on the valve stem.

16. A pressurised dispensing container as claimed in claim 1, wherein the valve is a continuous spray valve.

17. A pressurised dispensing container as claimed in claim 1, wherein the valve further comprises a metering chamber, and the valve is a metering valve.

18. A pressurised dispensing container as claimed in claim 17, wherein the metering chamber of the metering valve is permanent.

19. A pressurised dispensing container as claimed in claim 17, wherein the metering chamber is constructed wholly from rigid components formed from one or more materials selected from polyester, nylon, acetal, or the like, stainless steel, ceramics, glass, or the like.

20. A pressurised dispensing container as claimed in claim 1 which is a pharmaceutical dispensing device.

21. A pressurized dispensing container as claimed in claim 20, wherein the pressurized dispensing container is a pharmaceutical metered dose aerosol inhaler device.

* * * * *